R. BEAN.
DOUBLE ACTING PUMP.
No. 9,873. Reissued Sept. 13, 1881.
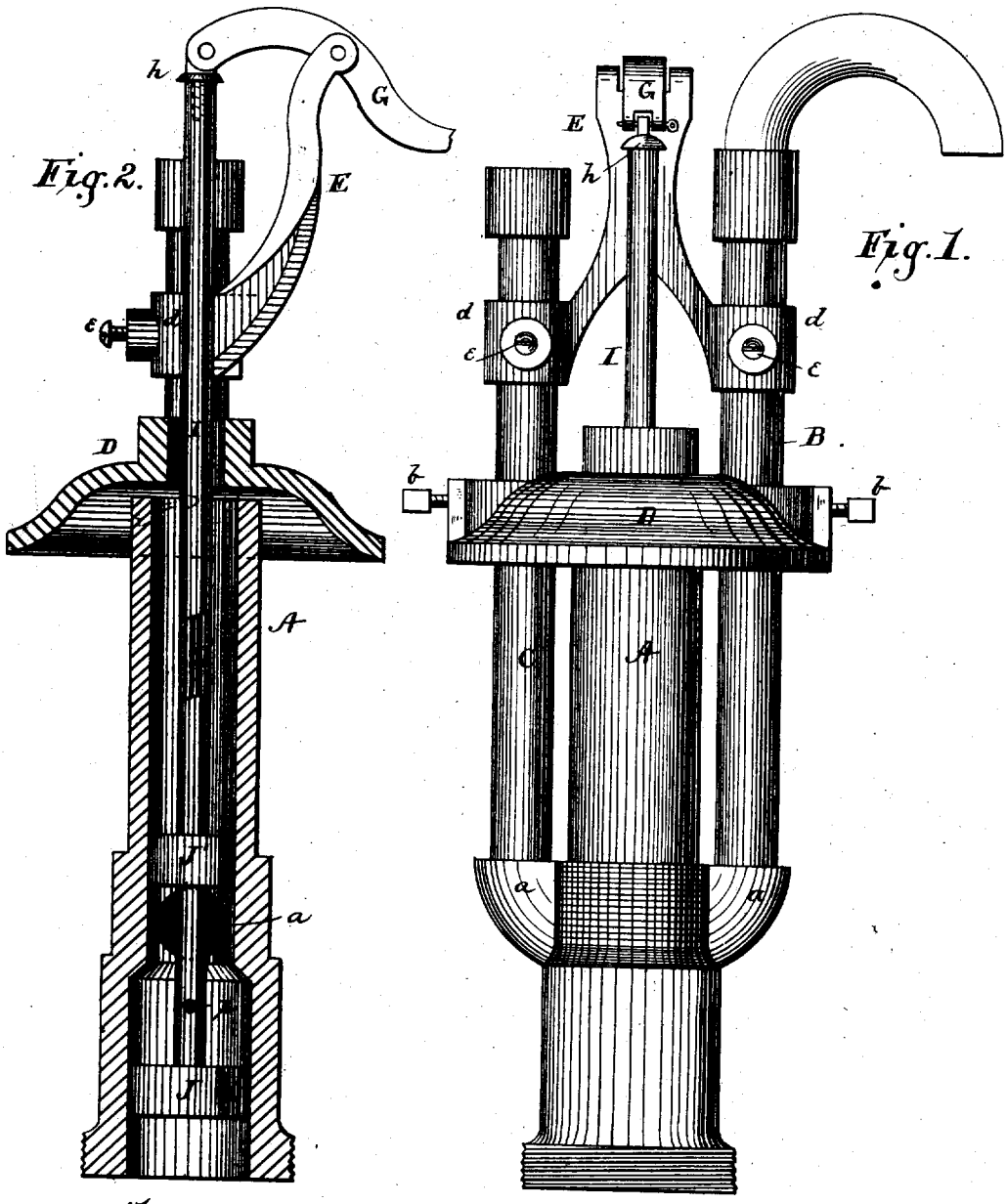
Witnesses,
Edwin L. Yewell,
H. Aubrey Toulmin
Inventor,
Roscoe Bean,
By his Attorney,
C. M. Alexander.

UNITED STATES PATENT OFFICE.

ROSCOE BEAN, OF SPRINGFIELD, OHIO.

DOUBLE-ACTING PUMP.

SPECIFICATION forming part of Reissued Letters Patent No. 9,873, dated September 13, 1881.

Original No. 197,082, dated November 13, 1877; Reissue No. 9,475, dated November 23, 1880. Application for reissue filed August 12, 1881.

*To all whom it may concern:*

Be it known that I, ROSCOE BEAN, of Springfield, in the county of Clarke and State of Ohio, have invented certain new and useful Improvements in Pumps; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

The nature of my invention consists in the construction and arrangement of a pump, as will be hereinafter more fully set forth; and it has for its object, first, to provide a means whereby the cylinder or main body thereof may be suspended below the sustaining-platform; and, further, to so construct the suspending device or devices that they will form an air-chamber and a discharge-pipe, and also a support for the handle-standard; and, secondly, to so construct and arrange its several parts that a continuous and even flow of water is obtained, which result is due to the inequality in the diameter of my cylinder and the use of two pistons on the same actuating-rod, when taken or used in connection with an air chamber or chambers communicating with the cylinder at a point intermediate of the pistons.

In the drawings I show two air-chambers communicating with the cylinder, one being formed of the actuating-rod and the other of the tubular supporting-piece C. When I use only the air-chamber formed of the actuating-rod, I may then form the supporting-piece C of a solid rod or bar instead of a pipe, as may be found most expedient.

In the accompanying drawings, Figure 1 is a side elevation of my improved pump, and Fig. 2 is a central vertical section of the same.

A represents the cylinder of my pump, formed with two branches or projections, *a a*, with openings in the top of the branches communicating with the interior of the cylinder. In one of the openings is screwed the discharge-pipe B, and in the other a pipe or rod, C. If this latter is a tube, its upper end should be closed, forming in such a case an air-chamber as well as a means of support, in connection with the said pipe B, for the cylinder, as above indicated.

D represents the platform-flange, having suitable apertures for the passage of the pipe B and pipe or rod C, and also for the pump-actuating rod I; and said platform is fastened to the parts B and C by means of set-screws *b b*, or, more properly speaking, the pump is suspended below the platform-flange by the set-screws holding the parts B and C therein. By this means the pump can be easily raised or lowered, as may be required, without loosening the platform from the curb or other support, or it may be permanently fixed.

E represents the handle-standard, having its lower ends forked and formed with sleeves or sockets *d d*, through which the parts B C are passed, and the standard then fastened by means of the set-screws *e e*. This standard can thus be adjusted to any height desired and easily fastened in position.

G is the pump-handle, pivoted in the top of the standard E, and connected to the pump-rod I.

The actuating-rod I is a tube closed at its upper end and arranged to attach to the pump-handle at its upper end, carrying at its other or lower end the pistons J′ and J, so disposed thereon as that the point of communication with the air-chamber will come between the said pistons.

Between the pistons there is an opening, *i*, in the actuating-rod, which forms an air-chamber, by which communication is had with the cylinder, so that the pressure of air will regulate the flow of water.

The cylinder A may be constructed, as shown, of unequal diameter, the lower or suction bucket working in the large bore and the upper or force bucket in the smaller bore. The object of this arrangement is that while the lower bucket is drawing water from the bottom, at the same time it is forcing one-half of the water into the upper part of the cylinder and the other half out at the spout. In returning, the balance of the water is discharged, making, in connection with the air-chamber in the pump-actuating rod I, an even stream or flow of water.

It will be seen that in the pump as thus constructed the pipes C and B not only serve to support the actuating mechanism of the pump, but also as an auxiliary air-chamber and exit-pipe for the pump, the two pipes in their arrangement adding greatly to the compactness of the whole.

Having thus fully described my invention, what I claim as new, and desire to secure by Letters Patent, is—

1. The combination of the pump-cylinder A, discharge-pipe B, tube or rod C, and the stationary platform D, the entire pump proper being adjustably suspended below said platform, substantially as and for the purposes herein set forth.

2. The adjustable handle-standard, forked at its lower end, and formed with sleeves or sockets having set-screws, as described, in combination with a pump having upwardly-projecting tubes, or one tube and one rod, substantially as herein set forth.

3. In a pump, a hollow rod, I, used as an air-chamber, in combination with two buckets of unequal size attached to it, and an air-discharge between the two buckets, substantially as and for the purposes herein set forth.

4. The hollow rod I, having opening *i*, and provided with the pistons J′ and J within the cylinder A, in combination with the pipes C and B, one serving as an auxiliary air-chamber and the other as an exit-pipe, and the two as supports for the operating mechanism of the pump, substantially as specified.

5. In combination with the pump-cylinder having two unequal diameters and the pistons fitting therein, the main and auxiliary air-chambers and exit-pipe, substantially as specified.

6. In a pump, the combination of a cylinder having two chambers of unequal diameters and a tubular support connecting the cylinder with the platform, substantially as shown.

7. In a pump, the combination of a suspended cylinder having two chambers of unequal diameters and a supporting tubular frame forming an extended air-chamber, and a water-discharge medium, substantially as shown.

8. In a pump, the combination of a cylinder having two chambers of unequal diameter, a tubular actuating-rod having pistons adapted to work in the respective bores of the cylinders, and an auxiliary or outer air-chamber, the rod and chamber communicating with the cylinder between the pistons, as shown.

9. In a pump, the combination of a double piston-cylinder with a tubular supporting-frame adapted to connect and suspend the cylinder below a platform and extend above the latter, forming a support for the handle-standard, substantially as shown.

10. In a pump, a supporting-flange provided with three openings or apertures for the reception of and in combination with the cylinder-supporting pieces, and the actuating-rod, as herein shown.

11. In a pump, a tubular discharge-opening between two pistons of unequal diameter and extending upwardly and connecting with the platform-flange and handle-standard, substantially as shown.

12. In a pump, a tubular air-chamber opening between two pistons of unequal diameter and extending upwardly, connecting with the platform-flange and handle-standard.

13. In a pump, a suspended piston-cylinder supported by pipes and having the handle above connecting with an actuating-rod carrying two pistons of unequal diameters, as shown.

14. In a pump, a suspended double piston-cylinder supported by a discharge-pipe and a rod or pipe, and arranged with the handle above connecting with an actuating-rod, and carrying two pistons of unequal diameter, as shown.

15. In a pump, a suspended double piston-cylinder having its actuating-rod connected to two buckets of unequal diameters, and an extended tubular air-chamber opening into the cylinder between the buckets, as shown.

16. In a pump, the combination of a platform-flange having openings for the passage of the actuating-rod and the supports, and the latter connecting with the lower part of the pump, as shown.

17. In a pump, the combination of a platform-flange having openings, as described, and the pump-supports extending upwardly and carrying the handle-standard.

18. In a pump, the combination of a platform-flange and the pump-supports extending above and below the platform and carrying at their respective ends the handle-standard and lower part of the pump, as shown.

19. In a pump, a double piston-cylinder supported by pipes from above, having a water-discharge and one or more communications between the pistons with air-chambers, for the purpose set forth.

In testimony whereof I affix my signature in presence of two witnesses.

ROSCOE BEAN.

Witnesses:
J. J. McCarthy,
C. A. Neale.